United States Patent [19]
Nessel et al.

[11] 3,920,806
[45] Nov. 18, 1975

[54] GROWTH PROMOTING SUBCUTANEOUS COMPOSITIONS

[75] Inventors: Robert J. Nessel, Edison; Jack Blodinger, Westfield, both of N.J.

[73] Assignee: Merck & Co., Inc., Rahway, N.J.

[22] Filed: May 4, 1973

[21] Appl. No.: 357,287

[52] U.S. Cl. ............................ 424/22; 260/239.55 R
[51] Int. Cl.² ..................... A61K 9/24; A01N 17/00
[58] Field of Search ............... 424/22; 260/239.55 R

[56] References Cited
UNITED STATES PATENTS

| | | | |
|---|---|---|---|
| 2,987,445 | 6/1961 | Levesque | 424/22 |
| 3,254,074 | 5/1966 | Arth et al. | 260/239.55 |
| 3,551,556 | 12/1970 | Kliment et al. | 424/21 |
| 3,565,991 | 2/1971 | Short | 424/243 |
| 3,737,521 | 6/1973 | Born | 424/22 |
| 3,787,394 | 1/1974 | Arth et al. | 260/239.55 R |

OTHER PUBLICATIONS

Kincl et al., "Steroids" (1968) No. 11, pp. 673–680.

*Primary Examiner*—Elbert L. Roberts
*Attorney, Agent, or Firm*—Frank M. Mahon; Harry E. Westlake, Jr.; Rudolph J. Anderson, Jr.

[57] ABSTRACT

Methods and compositions for subcutaneous application of 19-nor-20-spirox-4-ene-3-one, a growth promoting agent in a polymeric vehicle which possesses sustainted release property.

5 Claims, No Drawings

GROWTH PROMOTING SUBCUTANEOUS COMPOSITIONS

This invention relates to sustained release compositions and methods of administering 19-nor-20-spirox-4-ene-3-one, a growth promoting agent. More specifically, the invention relates to implant subcutaneous pellet pharmaceutical compositions containing 19-nor-20-spirox-4-ene-3-one and methods of promoting the growth of animals by administering the active agent in a polymeric vehicle. The active agent disclosed herein is useful in promoting growth in animals, preferably domestic animals.

It is an object of this invention to provide a sustained release composition in the pellet form which contains 19-nor-20-spirox-4-ene-3-one in a polymeric vehicle.

Another object of this invention is to provide a matrix capable of slowly and uniformly releasing the active agent, 19-nor-20-spirox-4-ene-3-one over a period of time.

A further object of this invention is to provide the active agent, 19-nor-20-spirox-4-ene-3-one in a stable pellet composition form.

In accordance with this invention, it is found that 19-nor-20-spirox-4-ene-3-one, a growth promoting steroid can be administered to animals by subcutaneous application of a pellet composition which contains the growth promoting steroid in a polymeric vehicle. It is found that the subcutaneous administration of the sustained release pellet compositions result in a continuous and uniform release of the steroid over a period of about 50 to 100 days. It is further found that this sustained release pellet composition permits the administration of a small daily dose of the active agent to animals over a long period of time thus maintaining a constant body titre of the active agent and with the handling of the animal required only at the initiation of the therapy.

The active agent 19-nor-20-spirox-4-ene-3-one employed in the practice of this invention is represented by Formula I below:

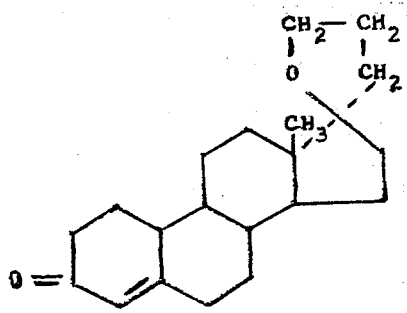

The pharmaceutical implant compositions of this invention contain a polymeric vehicle and 19-nor-20-spirox-4-ene-3-one as an active agent. The amount of active agent employed in the composition of this invention is not critical, however, the active agent may constitute from 5 to 50 percent of the total formulation weight. The vehicle may constitute from 50 to 95 percent of the total formulation weight. Of particular preference is the combination of 20 to 35 percent of the active agent and 65 to 80 percent of the polymeric vehicle to the total weight of the composition. The formulation included herein are effective in promotion growth in animals.

The compositions of this invention are conveniently prepared by granulating the steroid with the polymeric vehicle and pelleting the granulated product. Thus, the steroid can be thoroughly mixed with the polymer obtained by precipitation from a suitable solvent medium and the resulting mixture pelleted after removal of the solvent. Alternatively, the pellets are prepared by mixing the steroid and the polymeric vehicle in a suitable solvent medium, removing the solvent by evaporation and compressing the resulting homogeneous mixture of the steroid and the polymer into pellets. For example, the compositions are most conveniently prepared by precipitating the polymer in the form of a gel by cooling a solution containing the polymer in a suitable solvent medium separating the polymeric gel and granulating it with the steroid, drying the resulting mixture and finally pelleting the dried product to form pellets of the desired size. Alternatively, as one skilled in the art would appreciate, the steroid can be added to the solution which contains the polymer and the solvent, mixing to form a uniform mixture of the steroid and the polymer, removing the solvent by evaporation and compressing the mixture thus obtained into pellets of the desired size.

In order to insure that a sufficient and uniform amount of the steroid, 19-nor-20-spirox-4-ene-3-one is released internally, it is necessary to employ a vehicle which will uniformly release the steroid over an extended period of time. The vehicle employed herein is a polymeric material such as polyethylene, polypropylene, and polystyrene.

A comparison of a conventional lactose vehicle and a representative polyethylene sustained release vehicle employed in this invention is shown in Table I.

METHOD

A study was carried out to investigate the in vivo absorption rate of 19-nor-20-spirox-4-ene-3-one a growth promoting agent, from different types of pellets by implanting them one per ear, in both ears of nine sheep. Three sheep representing all pellets, were sacrificed at 2, 4 or 8 weeks post-implantation and the pellets were recovered and assayed to determine the amount of residual drug remaining. Each pellet contained 50 percent active agent.

ASSAY METHOD

The pellets are assayed as follows: Each pellet is extracted in a Soxhlet extractor with 150 ml methanol for 8 hours. The volume is made up to 250 ml and after proper dilution with methanol the U.V. absorbance of the solution is measured on a Cary 11 Spectrophotometer. The concentration of the drug is calculated from the absorbance at 241 mu. The postimplant lactose pellets were heavily encapsulated with tissues from the site of implantation. Since the methanolic extract of these pellets contained tissue extractives, a purification step is necessary to isolate the drug. The extract is passed through a column of Alumina which retained all impurities and the drug is eluted with methanol. As in the case of in vitro dissolution determinations the initial drug content is used in calculating the amount of the drug absorbed from the implants. The results are given in Table I.

Table I

| | Amount of Drug Absorbed Based on Initial Drug Content | | | | | |
|---|---|---|---|---|---|---|
| | % absorbed | | | Amount absorbed and initial drug content (mg) | | |
| Type | 2 weeks | 4 weeks | 8 weeks | 2 weeks | 4 weeks | 8 weeks |
| Polyethylene | 36.2 | 41.9 | 67.5 | 3.2/ 8.9 | 3.9/ 9.4 | 6.4/ 9.4 |
| Lactose 1 | 85.7 | 98.4 | 100.0 | 10.3/12.0 | 11.8/12.0 | 12.0/12.0 |
| Lactose 2 | 92.8 | 99.1 | 100.0 | 11.1/12.0 | 11.9/12.0 | 12.0/12.0 |

In summation, the rate of release of the drug from the lactose vehicle was more than twice (2) that from the polymeric vehicle employed in this invention.

The solvent employed in preparing the implant pellet composition of this invention is not critical. Any inert solvent which is capable of dissolving the polymeric vehicle may be employed in the preparation of the pellet composition. Representative solvents which may be employed in this invention are cyclohexane, chloroform, hexane, 1,1-2,2-tetrachloroethane, cyclobutane, cycloheptane, ether and methylene chloride.

It will be understood, however, that the specific subcutaneous dose level for any particular animal will depend on a variety of factors including age, weight, general health and the extent of growth promotion desired.

The steroid employed in this invention is disclosed in U.S. Pat. No. 3,254,074 wherein it is taught as an aldosterone inhibitor.

The following examples are given to illustrate the invention and are not intended to be limitations thereof.

EXAMPLE 1

With moderate agitation 50 ml. of 1,1,2,2-tetrachloroethane is heated to near reflux and maintained at this temperature while adding 4.0 gm. of polypropylene. The mixture is cooled to room temperature with agitation thereby precipitating the polypropylene gel which is isolated by decantation. 2.0 Grams of 19-nor-20-spirox-4-ene-3-one is granulated with the gel vehicle until a uniform mass results. The resulting mass is then cast into suitable molds, and after the solvent is allowed to evaporate, the residue is compressed into pellets containing about 33 percent of the active agent.

Other solvents, such as cyclohexane, cyclobutane, hexane, cyclopentane, ether, methylene chloride, or chloroform can be substituted for 1,1,2,2-tetrachloroethane.

EXAMPLE 2

With moderate agitation, 25 ml. of cyclohexane is heated to near reflux and maintained while adding 2.0 grams of 19-nor-20-spirox-4-ene-3-one and 2.0 grams of polyethylene. The solvent is allowed to evaporate and the resulting residual solid is ground to a suitable particle size. The granular material is then compressed on a suitable tablet machine, into pellets containing about 50 percent of the active ingredient.

Other solvents such as 1,1,2,2-tetrachloroethane, methylene chloride, cyclopentane, hexane, ether or chloroform can be substituted for cyclohexane.

EXAMPLE 3

The reaction of EXAMPLE 1 is repeated, except that polystyrene is substituted for polypropylene. Using the same reaction conditions and techniques, there is obtained the pellet composition.

What is claimed is:

1. A method of accelerating growth in animals which comprises subcutaneously applying a formulation comprising a polymeric vehicle selected from the group consisting of polyethylene, polypropylene and polystyrene and a therapeutically effective amount of an active agent, 19-nor-20-spirox-4-ene-3-one, wherein the vehicle constitutes from about 50 to 95 percent and the active agent constitutes from about 5 to 50 percent of the total formulation weight.

2. The method of claim 1 wherein the polymeric vehicle constitutes from about 65 to 80 percent and the active agent constitutes from about 20 to 35 percent of the total formulation weight.

3. The method of claim 2 wherein the polymeric vehicle is polyethylene.

4. The method of claim 2 wherein the polymeric vehicle is polypropylene.

5. The method of claim 2 wherein the polymeric vehicle is polystyrene.

* * * * *